United States Patent [19]

Luukonen et al.

[11] 4,036,378
[45] July 19, 1977

[54] ATTACHMENT TO POLE SKIDDER VEHICLE FOR LOADING, HAULING, AND STACKING CUT LOGS

[76] Inventors: Leroy D. Luukonen, Box 53; Arthur E. Tieden, both of Laporte, Minn. 56461

[21] Appl. No.: 688,252

[22] Filed: May 20, 1976

[51] Int. Cl.² .............................................. B66C 1/42
[52] U.S. Cl. ........................................ 214/92; 294/74
[58] Field of Search ................. 214/85.5, 92, 94, 523; 212/7; 294/74

[56] References Cited

U.S. PATENT DOCUMENTS

| 3,233,762 | 2/1966 | Cross | 214/85.5 |
| 3,424,326 | 1/1969 | Thatcher | 214/85.5 |

Primary Examiner—Robert G. Sheridan
Attorney, Agent, or Firm—Robert E. Kleve

[57] ABSTRACT

The invention comprises an attachment for a pole skidder vehicle for hauling and stacking cut logs. The attachment is adapted to be mounted to the rear of a conventional pole skidder vehicle and has a pair of upright fixed arms. A pivotally mounted plate is pivotally mounted to the upper ends of the fixed arms and is hydraulically actuated. A separate length of cable is used to initially stack the cut logs thereon. A winch cable from the vehicle has a plurality of detachable connections at its other end whereby the winch cable may be placed across the top of the stack and connected to the outer ends of the separate length of cable to encircle the stack. A winch on the vehicle may then wind the winch cable to draw the stack up against the movable plate and the initial stack of cut logs may be hauled to a stacking location. The movable plate may thereupon be actuated to pivot the plate and the initial stack upward and the vehicle backed up to the end of a row of previously stacked cut logs and the cable connection released and the cables wound back by the winch to enable the initial stack to be unloaded at the end of the previously stacked row of cut logs.

4 Claims, 9 Drawing Figures

ATTACHMENT TO POLE SKIDDER VEHICLE FOR LOADING, HAULING, AND STACKING CUT LOGS

This invention relates to an attachment to a pole skidder for loading and hauling and piling or stacking cut logs.

It is an object of the invention to provide a novel attachment which can be attached to a pole skidder for loading, hauling, and piling cut logs which can be easily operated and rapidly attached and detached to the pole skidder.

It is another object of the invention to provide a novel attachment for a pole skidder which can be used for loading, hauling, and piling cut logs which provides a cable structure having a novel, rapid method of attaching a cable about a load or pile of cut logs, which includes a hydraulic actuated plate having a pivot point above the main frame of the skidder so that once the cables have winched the load up against the pivoting plate and hauled it to the location for stacking the load may be pivoted upward with the cables having releasing means to unload the logs while the plate is pivoted upward.

It is another object of the invention to provide a novel device for a pole skidder which can be used for loading, hauling and stacking or piling cut logs, which has a novel structure for rapidly attaching a cable snuggly about a pile of cut logs with a pivotally mounted plate mounted to the rear of the vehicle which acts to align the logs and pivot them well above the frame of the skidder for stacking or piling.

Further objects and advantages of the invention will become apparent as the description proceeds and when taken in conjunction with the accompanying drawings wherein:

FIG. 1 is a side elevational view of the pole skidder vehicle with attachment for loading, hauling, and stacking or piling cut logs attached to the rear of the vehicle.

FIG. 2 is a side elevational view with a fragmentary showing of the attachment and illustrating the separate length of cable for initially stacking a single load of cut logs thereon, with the ends of the separate length of cable shown in phantom lines before the winch cable has been attached and shown in solid lines after the winch cable has been connected to the end of the separate length of cable to encircle the single load or single stack.

FIG. 3 is a side elevational view of the loading plate attachment after the cables have been connected about the single stack of cut logs and the single stack is drawn up against the movable plate for hauling to the stacking location. The movable plate and single stack are shown in a raised position in phantom lines to illustrate their position when the vehicle has reached the stacking location just prior to the unloading of the end of a row of previously stacked cut logs. The stacks are shown in their two positions by the cables and their shape within the illustration of the cut logs therein deleted for clairity.

FIG. 6 is a top plan view of the double socket connection.

FIG. 7 is a side elevational view of the double socket.

FIG. 8 is a view taken along line 8—8 of FIG. 6.

FIG. 9 is a view of the sliding socket member.

Briefly stated, the invention comprises an attachment for a pole skidder for loading, hauling, and piling or stacking cut logs adapted to be attached to the rear of a pole skidder vehicle, said attachment having a mounting frame for mounting to the rear of the skidder vehicle, a pivotally mounted hydraulically activated plate pivotally mounted to the frame with its pivot point well above the melt frame of the vehicle, said plate having a pair of alignment arms at its upper end, a first cable length for placement on the ground and placement of a load of cut logs thereon, a winch cable having its one end attached to a winch or the vehicle, a plurality of attachment means along the other end of the cable for extending a portion of the winch cable over the upper surface of the cut logs placed on the first cable length and attaching the winch cable to the ends of the first cable to encircle the load of cut logs, whereby the winch cable may be wound by a winch to draw the load of cut logs up against the pivotally mounted plate and raised by the winch cable upward off the ground while against the plate and against the alignment arms for aligning the cut logs for hauling the load of cut logs to a stacking location, whereby when the vehicle has reached the location for stacking, the pivotally mounted plate may be pivoted upward hydraulically to raise the load and the cable detached to allow the load to drop onto the previously stacked cut logs in a row of generally uniform height.

Figure 1:
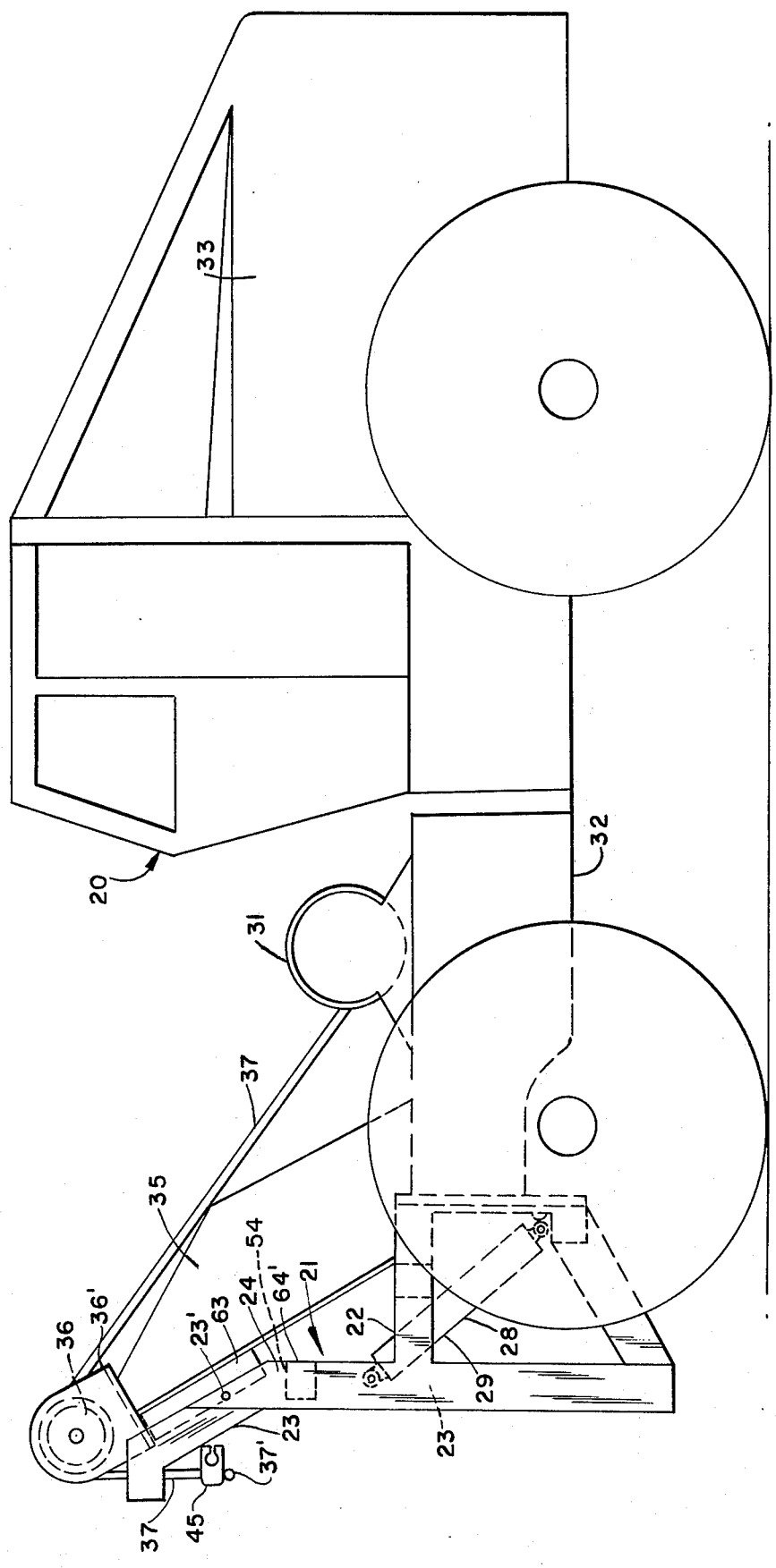
Figure 2:
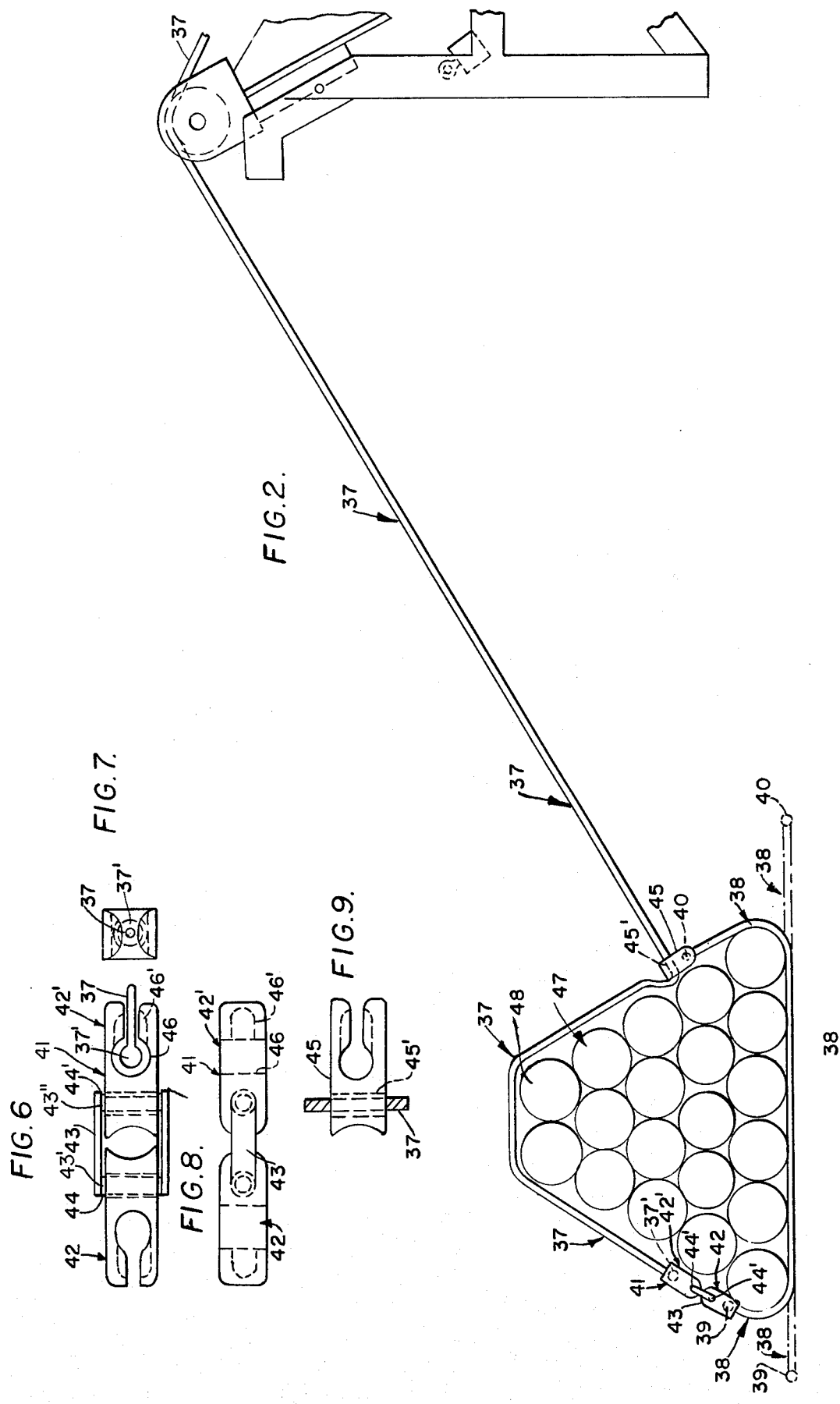
Figure 3:
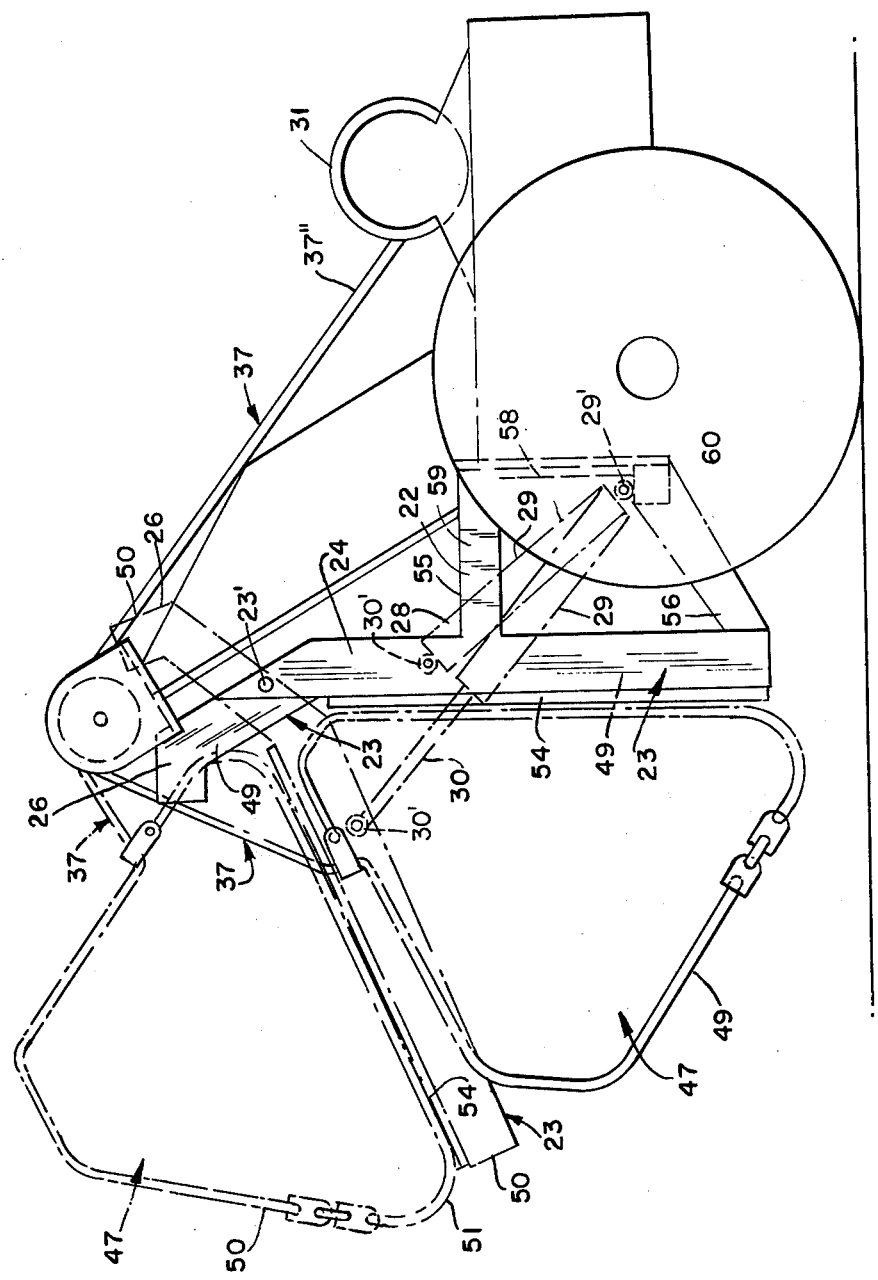

Referring more particularly to the drawings in FIGS. 1, 2, and 3, a conventional pole skidder vehicle 20 is illustrated with the attachment invention 21 for loading, hauling, and piling or stacking cut logs mounted to the rear of the pole skidder vehicle.

The attachment 21 has a mounting frame 22 and pivotally mounted lifting or loading plate 23. The frame 22 has a pair of fixed upright arms 24 and 25 fixed to the frame and projecting upward. The plate 23 is pivotally mounted to the upright arms 24 and 25 of the frame at pivot points 23' and 23".

The mounting plate 23 has a pair of spaced arms 26 and 27 with the upper ends projecting rearward and upward at an angle with a plate fixed across the arms. A hydraulic cylinder 28 has a cylinder portion 29 pivotally mounted to the frame 22 and a piston portion 30 pivotally mounted to the mounting plate 23 by lugs at pivot points 29' and 30'. Whereby actuation of the cylinder projects the piston 30 to pivot the mounting plate from its position shown in solid lines in FIG. 3 to its upward position shown in dashed lines in FIG. 3.

The vehicle 20 has a conventional power winch 31 mounted to the rear frame 32 of the vehicle. The vehicle has an engine 33 mounted to the front frame 34 for powering the vehicle with an articulated connection between the front and rear frame.

A conventional arch or beam 35 is fixed to the rear frame which is used for conventional pole skidding for hauling uncut logs. A roller 36 is rotatably mounted to a pair of flanges 36' and 36" which flanges are fixed to the top of the beam 35.

A winch cable 37 has its inner portion 37" wrapped around the drum 31' of the winch 31 a number of turns with its innermost end fixed to the drum. The drum is power driven in a conventional manner.

A separate length of steel or wire cable 38 is employed in connection with the invention and forms a part of the invention. The separate length of cable 38 has a pair of knobs 39 and 40 fixed to its outer ends.

A double socket member 41 has a pair of conventional sockets 42 and 42' of a conventional construction. The socket member 42 and 42' modified by being joined together by a rectangular frame 43. The end rods 43' and 43" of the frame can pivot in bores 44 and 44' of the sockets 42 and 42' so that the two sockets may pivot and shift relative to one another and bend about curved surfaces such as logs.

A third socket member 45 has a bore 45' and the third socket member 45' is slidably mounted on the winch cable 37.

The knobs on the cables are attached to the sockets in a manner well known in the art by inserting the knobs into the bore socket 46 and then sliding the knob back into the recessed portion 46'.

Operation

The attachment for loading, hauling, and stacking cut logs when attached to a pole skidder vehicle as illustrated.

To load the attachment 20 with a single stack 47 of cut logs, the operator will first lay the separate length of cable 38 on the ground near the cut logs to be hauled. The cut logs 48 will be stacked on top of the separate length of cable 38 as illustrated in FIG. 2, in a pryamide form, with the length of the cable generally determining the limit to the width of the stack, since the knobs at the ends of the separate length of cable should not be covered up by the stack.

The spearate length of cable 38 is intended to be approximately 7½ feet in length which has been found to be long enough to place an adquate size single stack of 47 cut logs thereon, as generally illustrated. The length of the cable may vary depending upon the size of the load it is desired to load, haul, and stack. The logs will be stacked so that the cable lies generally in the center of the length of the logs in the stack.

Once the cut logs 48 have been stacked over the cable 38 to form a single stack, thereafter the two double socket members 42 and 42' will be used by attaching the know 37' at the end of the winch cable 37 into the socket member 42', as illustrated in FIGS. 3 and 8, and then drawing the winch cable 37 with the double socket members attached, over the top of the stack of cut logs 47 and attaching the other socket member 42 to the knob 39 of cable 38, as illustrated in FIG. 3. Thereafter, the third socket member 45 will be slid along the cable 37 and attached to the knob 40 of cable 38 at the other end of the separate length of cable 38, so that the intermediate portion of the cable 37 between the double socket members 42 and 42' and third socket member 45 will lay across the top of the stack centrally of the length of the logs in the stack.

Once the third socket member has been attached, the cable winch vehicle will be actuated to wind the winch cable onto the drum so that the winch cable is drawn toward the vehicle. This causes the winch cable 37 to slide forward in the bore 45' of the third socket member 45, toward the vehicle, until the separate length of cable and an intermediate portion of the winch cable over the top of the stack become tight or tant about the stack.

Thereafter, the drawing of the winch cable toward the vehicle will draw the stack toward the vehicle, up against the movable plate and then the winding and drawing of the winch cable will raise the stack up to its position shown generally in solid lines in FIG. 3 and designated by numeral 49. The load will normally be drawn up further than illustrated so that the upper logs in the stack abutt the angular forward ends of the spaced arms 26 and 27 to align the logs in the stack to prevent the logs from tipping to one side or the other.

Thereafter, the pole skidder vehicle will be driven to a stacking location where the single stacks of logs are stacked together into a single long row of approximately 5-6 feet in height.

When the vehicle must be backed up near to the end of a single row of previously stacked logs then the hydraulic cylinder 28 will be actuated to pivot the mounting plate upward to its position shown in dashed lines and designated by numeral 50 to raise the stack upward to its position shown in dashed lines in FIG. 3. The winch will also be actuated to wind the winch cable to take up any slack in the cable.

When the movable plate is pivoted fully upward to its position shown in dashed lines and designated by numeral 50, the lower end 51 of the load, shown in dashed lines, will be at least approximately 5 feet off the ground so that all or nearly all of the load will be above the height of the previously stacked cut logs forming the long single row.

The pole skidder vehicle will then be backed up further until the stack 47 on the movable plate engages the logs at the end of the single long row of logs so that the lower most end 52 of the load rests upon the logs near the top of the row at the adjacent end of the row. Thereafter the winch will be reversed for a short interval to unwind the winch cable to create a slack in the winch cable across the top of the stack. Then the third socket member will be unhooked from the knob of the separate length of cable. Then the winch will be reversed again for an interval long enough to wind the winch cable and thereby draw the separate cable length out from undernearth the stack and up onto the roller.

Whereupon the stack or load will be free of the encirclement by the cables and the vehicle is driven forward gradually allowing the stack or haul of cut logs to unload along the end of the long row. The plate 23 may be lowered back to its position 49.

By being able to raise nearly all or most of the stack of cut logs above the height of the long row of previously stacked logs while unloading, a uniform height to the row can be achieved.

The hydraulic cylinder will be connected to a conventional hydraulic pump system on the vehicle with conventional controls so that the plate 23 may be pivoted to any selected height the limit of the stroke of the cylinder.

Thus, it will be seen that a novel attachment has been provided for easier loading, hauling, and stacking cut logs into a row so that the logs in the row thereafter can be picked up by truck for long distance hauling.

The attachment may be easily modified to mount to various types of pole skidder vehicle by modifying the mounting frame accordingly.

Also, the attachment does not require the removal of the beam or any components of the pole skidder when it is desired to use the pole skidder for hauling cut logs, as the attachment does not interfere with these components.

The mounting plate 23 has the plate 64 fixed across the arms 26 and 27 and has a lateral beam 64' fixed between the arms 26 and 27.

The frame 22 has a pair of forwardly extending beams 55 and 56 extending rearwardly and fixed to arm 24 and a similar pair of beams 55' and 56' extending rearwardly and fixed to arm 25. A vertical strip 58 is fixed between the upper and lower forward end of beams 55 and 56. A similar vertical strip 58' is fixed between the upper and lower end of beams 55' and 56', a lateral beam 59 is fixed between beams 55 and 55' and a lateral beam 60 is fixed between beams 56 and 56'.

The bolts 61 are inserted into bores in vertical strip 58 and 58' of the frame and are threaded into the rear main plate 62 of the skidder device to attach the frame to the skidder.

Some conventional pole skidders have a pair of conventional rollers 63 and 63' mounted at the rearward edge of the spaced plates forming the beam 35. When the load is lifted to its position 50. The cut logs may be caused to engage the spaced rollers on the beam to keep the load from tilting to one side or another just before detaching the cable.

To mount the attachment 21 to the pole skidder, a socket member similar to the socket member 43 may be welded to the mounting plate 23 at the location 53 on beam 64'. The knob 37' on the winch cable will be inserted into the socket and the winch cable will be inserted into the socket and the winch activated to wind the winch cable to raise the attachment 21 to approximately its height, illustrated in FIGS. 1, 2, and 3, and then the attachment may be swung to place the frame 22 against the rear main plate 62 of the pole skidder and bolts 61 may be inserted into the frame and threaded into the rear main plate of the pole skidder to fix the frame to the pole skidder vehicle. Thereafter the winch cable will be given slack by reversing the winch and the knob 37' will be unhooked from the socket member on the mounting plate. Thereafter the hydraulic cylinder 28 may be connected to the hydraulic cylinder.

The attachment 21 may be detached by the reverse operation.

The term cut logs is meant specifically to be pulpwood and bolts. Also, the attachment is intended to be used primarily for loading, hauling, and stocking pulpwood and bolts of approximately 8 feet in length which length is approximately the width of the pole skidder vehicle. However, the length of the pulpwood and bolts may vary.

It is intended that there be a number of the separate lengths of cables so that a number of initial stacks of cut logs may be stacked ahead of time before the actual loading is done with the attachment.

Figures 4, 5:
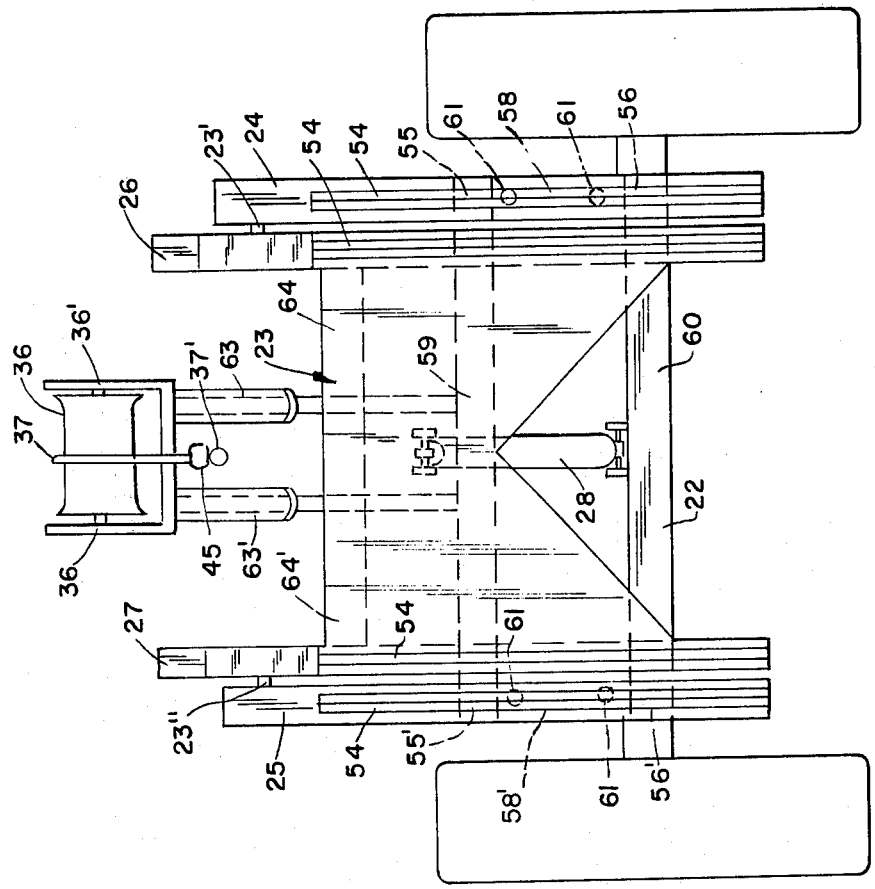
FIG. 4 is a rear elevational view of the attachment for loading, hauling, and stacking cut logs, shown attached to the pole skidder vehicle.
FIG. 5 is a top plan view of the attachment for loading, hauling, and stacking cut logs, shown attached to the vehicle.

Also, ribs 54 may be provided on the arms 26 and 27 and upright poles 24 and 25, as illustrated in FIGS. 4 and 5, if desired, to space the load away from the plate 23, so that the cable 38 and its knobs will not rub on the plate 23, when removing the cable 38 from underneath the load. Although, in the drawing the cables 37 and 38 and their knobs are shown larger in relation to the rest of the attachment, this if for ease in illustration. In actuality the cables 37 and 38 and their knobs will have a diameter less than the amount of horizontal projection of the ribs 54 so that the ribs will push the load far enough away from the plate 23 to allow the cables and their knobs to clear between the load and plate. The ribs 54 also serve to bite into the load and stabilize the load to prevent the load from shifting.

It will be obvious that various changes and departures may be made to the invention without departing from the spirit and scope thereof and accordingly, it is not intended that the invention be limited to that specifically described in the specification or as illustrated in the drawing but only as set forth in the appended claims wherein.

What is claimed is:

1. An attachment for a pole skidder vehicle for hauling and stacking cut logs comprising a frame adapted to be detachably mounted to the rear of the pole skidder vehicle, said frame having a pair of fixed upright arms, a pivotally mounted movable plate pivotally mounted to the upper end of the fixed arms, hydraulic means to actuate the movement of the plate, a separate length of cable for initially stacking cut logs thereon, a winch cable for the vehicle having a plurality of detachable connections thereon whereby the winch cable may be placed across the top of the stack and connected to the outer ends of the separate length of cable to encircle the stack, a winch on the vehicle, said winch acting to wind the winch cable to draw the initial stack up against the movable plate, whereupon the initial stack of cut logs may be hauled to a stacking location, said movable plate may thereby be actuated to pivot the movable plate and initial stack upward and the vehicle backed up to the end of a row of previously stacked cut logs at the stacked location and at least one of the cable connections detached and the cables wound back by the winch to enable the initial stack to be unloaded at the end of the previously stacked row of cut logs.

2. An attachment for a pole skidder according to claim 1 wherein said pivotally mounting location be located spaced above the frame of the vehicle to enable the initial stack to be raised above the level of the previously stacked row of cut logs for a more effective and uniform unloading of the cut logs so that the row when stacked may maintain a uniform height.

3. An attachment for a pole skidder according to claim 2 wherein said one of said plurality of detachable connections is mounted at the remote end of said winch cable and the other is slidably mounted on the winch cable for attachment to enable it to be adjustable and also enable the winch cable and separate length of cable to tightly encircle the initial stack by the winch cable sliding in the slidable connection when the winch cable is wound for hauling.

4. An attachment for a pole skidder according to claim 2 wherein one of said plurality of detachable connections is mounted at one end of the winch cable and has detachable means for said connection to one of the outer ends of the separate length of cable and wherein the other of said detachable connections is slidably mounted on the winch cable and has detachable means for said connection to the other of the outer ends of the separate length of cable, with said slidably mounted connection being slidable on the winch cable to be adjustable and to enable the winch cable and separate length of cable to tightly encircle the initial stack by the winch cable sliding in the slidable connection when the winch cable is wound for hauling.

* * * * *